July 16, 1968 G. E. BLAIR ETAL 3,393,060
METHOD OF CHANGING THE CONDUCTIVITY OF CERAMIC MATERIALS
Original Filed March 18, 1963 2 Sheets-Sheet 1

INVENTORS
GERALD E. BLAIR
DAVID P. HAMBLEN
ROBERT A. WEIDEL
BY
ATTORNEYS

United States Patent Office 3,393,060
Patented July 16, 1968

3,393,060
METHOD OF CHANGING THE CONDUCTIVITY OF CERAMIC MATERIALS
Gerald E. Blair, Galita, Calif., and David P. Hamblen, Gates, and Robert A. Weidel, Webster, N.Y., assignors to Bausch & Lomb Incorporated, Rochester, N.Y., a corporation of New York
Continuation of application Ser. No. 265,636, Mar. 18, 1963. This application Oct. 13, 1966, Ser. No. 586,573
2 Claims. (Cl. 65—33)

ABSTRACT OF THE DISCLOSURE

A method is disclosed for reducing the specific resistivity of a glass composition including the major portion of vanadium pentoxide and a minor portion of numerous metal phosphates. The glass substrate is heated in a temperature range between the transition temperature and the liquidus temperature for a period of time sufficient to cause crystallization. The crystallization effectively reduces the specific resistivity of the glass.

---

This application is a continuation of Ser. No. 265,636, filed Mar. 18, 1963, now abandoned.

This invention relates to a method of changing the conductivity of ceramic materials and more particularly to a method of treating vanadium phosphate materials in order to change the electrical characteristics thereof.

The increased interest in ceramic semi-conductors has led to several studies of the electrical properties of various ceramic compositions. Such studies have indicated that glass compositions which contain high percentages of vanadium oxide produce glasses which have characteristic low resistivities. Glasses of this type have been disclosed in the British Patents 744,205 and 744,947 which were published on Feb. 1, 1956, and Feb. 15, 1956, respectively.

Attempts to utilize vanadium compositions as semiconductor materials led to the development of certain metaphosphate compositions which are disclosed and claimed in our copending application entitled, "Ceramic Compositions," Ser. No. 266,062 filed Mar. 18, 1963, now Patent No. 3,278,317. This approach resulted in obtaining glasses which could be produced in relatively large melts and which nevertheless had the desired electrical properties.

It has now been found that vanadium phosphate glass containing a major portion of vanadium pentoxide can be treated according to the novel method disclosed herein in order to produce various degrees of crystallization. This crystallization is effective to produce a relatively large change in the specific resistivities of the materials. For example, a vanadium glass containing potassium metaphosphate was treated by a method according to the present invention to thereby reduce its specific resistivity from about $10^3$ ohms per centimeter to 10 ohms per centimeter.

Briefly, the present invention contemplates heat treating vitreous samples to produce varying amounts of crystallization to thereby produce a relatively large change in the specific resistivity. This change in electrical resistance is particularly dependent upon the thermal history below the liquidus temperature but above the transformation range of the material. The aforementioned thermal history relates to a heat treaatment which may be subsequent to the normal casting and annealing procedures.

The invention will now be described in more detail in connection with the accompanying drawings in which.

Figure 1:
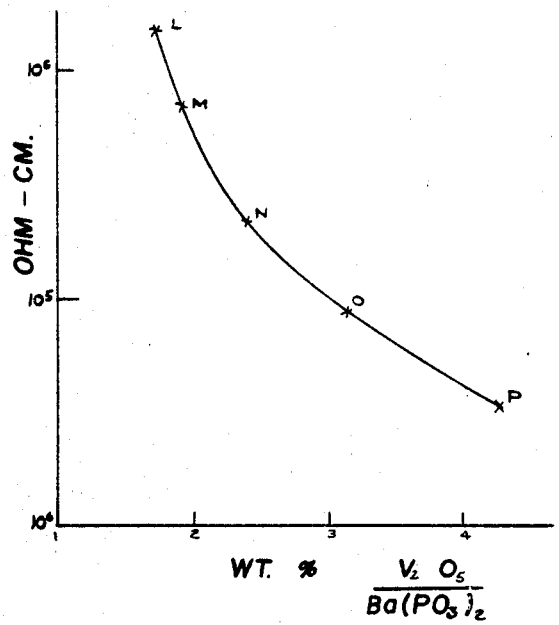
FIG. 1 is a graphical representation showing the change in resistivity with respect to the change in vanadium oxide.

The novel treatment may be defined as promoting nucleation and subsequently crystallization in a vitreous material, frequently called devitrification. It is presently preferred to treat the materials by subjecting them to heat, i.e. to a temperature between the liquidus temperature and the transformation temperature for a period of approximately ½ hour.

The compositions set forth hereinafter show the raw batch analysis of various vanadium phosphate glasses which have been used to illustrate the effect of treating such compositions by the novel method according to the present invention. As shown in the examples, the ceramic semiconductors can be prepared from batch ingredients containing a major portion (by weight) of vanadium pentoxide with a minor portion of numerous metal phosphates. Glass compositions containing vanadium pentoxide in the amount of 60 to 84 weight percent in the batch have been shown to undergo devitrification during reheating. After casting the molten glass, the ceramic material is heated in the temperature range between the transition temperature and the liquidus temperature for a period of time sufficient to alter the resistivity. The semiconductors are ordinarily used at ambient temperatures.

COMPOSITION A

| Ingredient | Mole Percent | Wgt., Percent | Specific Resistivity |
|---|---|---|---|
| $V_2O_5$ | 63.22 | 75.0 | 626K |
| $NaPO_3$ | 36.78 | 25.0 | |

COMPOSITION B

| Ingredient | Mole Percent | Wgt., Percent | Specific Resistivity |
|---|---|---|---|
| $V_2O_5$ | 71.90 | 84.0 | 10K |
| $LiPO_3$ | 28.10 | 16.0 | |

COMPOSITION C

| Ingredient | Mole Percent | Wgt., Percent | Specific Resistivity |
|---|---|---|---|
| $V_2O_5$ | 70.42 | 70.0 | 157K |
| $PbPO_3$ | 29.58 | 30.0 | |

COMPOSITION D

| Ingredient | Mole Percent | Wgt., Percent | Specific Resistivity |
|---|---|---|---|
| $V_2O_5$ | 66.52 | 75.0 | 239K |
| $KPO_3$ | 33.48 | 25.0 | |

COMPOSITION E

| Ingredient | Mole Percent | Wgt., Percent | Specific Resistivity |
|---|---|---|---|
| $V_2O_5$ | 72.0 | 76.0 | 186K |
| $Ba(PO_3)_2$ | 28.0 | 24.0 | |

COMPOSITION F

| Ingredient | Mole Percent | Wgt., Percent | Specific Resistivity |
|---|---|---|---|
| $V_2O_5$ | | 65.0 | 39K |
| $Cd(PO_3)_2$ | | 35.0 | |

COMPOSITION G

| Ingredient | Mole Percent | Wgt., Percent | Specific Resistivity |
|---|---|---|---|
| $V_2O_5$ | | 70.0 | 27K |
| $Cd(PO_3)_2$ | | 30.0 | |

COMPOSITION H

| Ingredient | Mole Percent | Wgt., Percent | Specific Resistivity |
|---|---|---|---|
| $V_2O_5$ | | 75.0 | 10K |
| $Cd(PO_3)_2$ | | 25.0 | |

COMPOSITION I

| Ingredient | Mole Percent | Wgt., Percent | Specific Resistivity |
|---|---|---|---|
| $V_2O_5$ | | 60 | 870K |
| $V_2O_3:3P_2O_5$ | | 40 | |

COMPOSITION J

| Ingredient | Mole Percent | Wgt., Percent | Specific Resistivity |
|---|---|---|---|
| $V_2O_5$ | | 70 | 320K |
| $V_2O_3:3P_2O_5$ | | 30 | |

COMPOSITION K

| | | |
|---|---|---|
| $V_2O_5$ | 80 | |
| $V_2O_3 \cdot 3P_2O_5$ | 20 | 49K |

The specific resistiivties shown above relate to the specific resisitivites of the vitreous glasses prior to subjecting the glasses to crystallization.

The glasses set forth in the various examples may be prepared in various ways. For example, the ingredients in the powdered form are mixed and placed in a platinum crucible. The crucible containing the mixture is placed in an electric resistance furnace and the ingredients are melted therein at a temperature of approximately 900° C. Relatively small melts were made in this manner and were held at this temperature for approximately 3–4 hours. Larger melts were also made at this same temperature, however, were stirred according to conventional glass making techniques for approximately 4 hours. The smaller melts were cast at approximately 900° C. on a plate having a temperature of approximately 100° C. In the case of the larger melts the melt was cooled to approximately 700° C. with continued stirring prior to casting on a plate of about 100° C. All types of the glass disclosed herein were annealed at approximately 250° C.

Table I illustrates the effect of heat treating vanadium phosphate materials at various temperatures and for various time intervals in accordance with the novel method disclosed herein.

TABLE I

| Sample: | Temperature, ° C. | Time | Specific Resistivity |
|---|---|---|---|
| A | 380 | 5 hrs | 59K |
| B | 260 | 5 hrs | 706K |
| B | 250 | 15 min | 294K |
| | 250 | 30 mins | 276K |
| | 250 | 60 mins | 5K |
| | 250 | 120 mins | 43K |
| | 250 | 240 mins | 233K |
| C | 260 | 5 hrs | 5K |
| D | 310 | 5 hrs | 0.021K |
| E | 290 | 5 hrs | 10K |
| | 250 | 5 hrs | 5.2K |
| | 270 | 5 hrs | 0.65K |
| | 290 | 5 hrs | 0.44K |
| | 310 | 5 hrs | 0.24K |
| | 330 | 5 hrs | 0.097K |
| | 350 | 5 hrs | 0.011K |
| E | 290 | 15 mins | 0.26K |
| | 290 | 30 mins | 0.12K |
| | 290 | 60 mins | 0.13K |
| | 290 | 120 mins | 0.15K |
| | 290 | 240 mnis | 0.23K |
| F | 310 | 5 hrs | 240K |
| G | 310 | 5 hrs | 210K |
| H | 310 | 5 hrs | 150K |

FIG. 1 is a typical curve showing the change in resistivity with respect to a corresponding change in composition. This curve was plotted for changes in the rates of $V_2O_5$ in weight percent with respect to changes in $Ba(PO_3)_2$ in weight persent. These changes are shown in tabular form in Table II.

TABLE II

| Sample: | Ingredient | Weight, Percent | Specific Resistivity, ohm-cm. |
|---|---|---|---|
| L | $V_2O_5$ / $Ba(PO_3)_2$ | 62.1 / 37.9 | 1,700K |
| M | $V_2O_5$ / $Ba(PO_3)_2$ | 65.0 / 35.0 | 793K |
| N | $V_2O_5$ / $Ba(PO_3)_2$ | 70.0 / 30.0 | 240K |
| O | $V_2O_5$ / $Ba(PO_3)_2$ | 75.0 / 25.0 | 93K |
| P | $V_2O_5$ / $Ba(PO_3)_2$ | 80.0 / 20.0 | 19K |

The specific resistivities shown were measured prior to subjecting the samples to the novel method which is the subject of the present claims.

Figure 2:
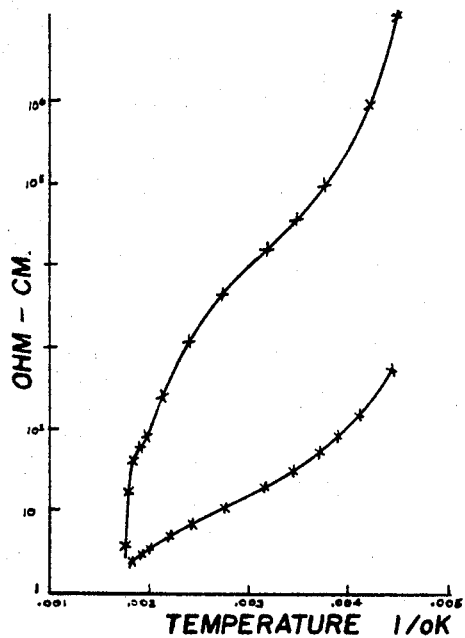
FIG. 2 is a graphical representation showing the relationship between specific resistivity and temperature for a vanadium oxide potassium metaphosphate glass.

The relationship between specific resistivity and measuring temperature is illustrated by the graphical representation shown in FIG. 2. The graphical data was obtained by measuring the specific resistivity of glass samples taken from the melt identified as Composition D, i.e. a composition containing 75 weight percent $V_2O_5$ and 25 weight percent $KPO_3$ at various temperatures. The lower curve shows the temperature-resistivity relation for the reheated material.

Figure 3:
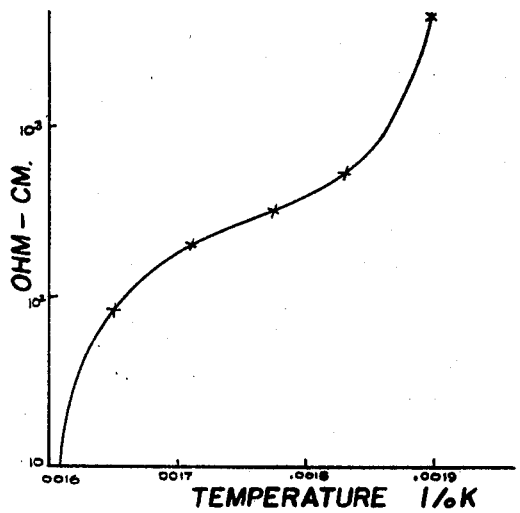
FIG. 3 is a graphical representation showing the effect on specific resistivity when the vanadium oxide potassium metaphosphate glass is held at various temperatures for five hours; annealed and measured at 40° C.

FIG. 3 shows the effect of subjecting the glass taken from the same sample identified as Composition D to progressively higher temperatures for five hours. This shows that as a general rule there is a sharp reduction of resistivity as the temperatures are increased above the transition range. The rate of change decreases as the temperature approaches the softening range.

Figure 4:
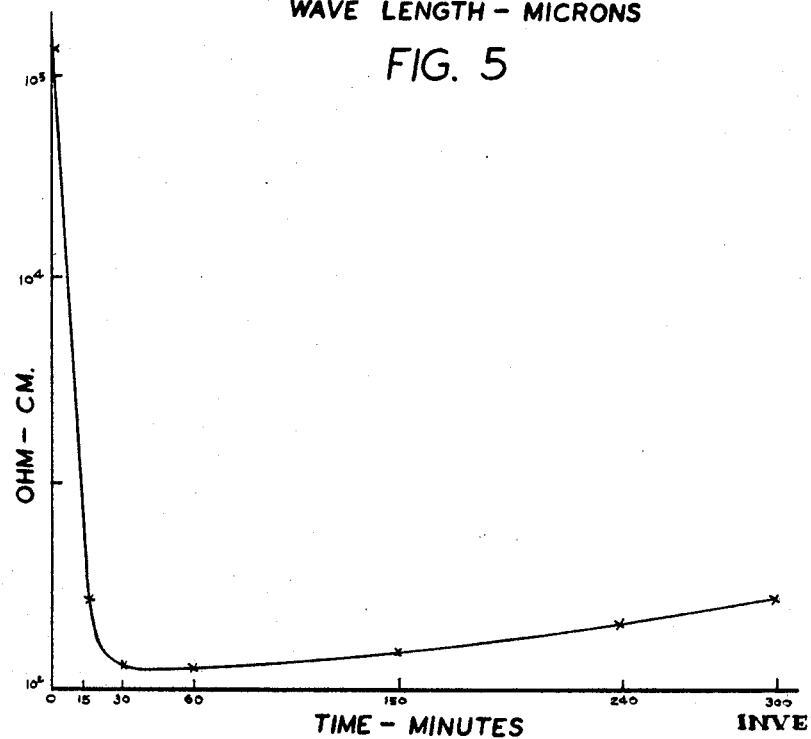
FIG. 4 is a graphical representation showing the variation in specific resistivity when samples of vanadium metaphosphate glass are held at 310° C. for various times, then are annealed and measured at 40° C. and, FIG. 5 is a graphical representation showing the infrared transmission of one sample of vanadium phosphate glass at various temperatures.

The effect of holding the sample 75 weight percent $V_2O_5$, 25 weight percent $KPO_3$ i.e. Composition D at the same temperature i.e. a temperature which is above the transformation range, for various periods of time is shown by the graphical representation in FIG. 4. This shows that the greatest drop in resistivity occurs during the first half hour of treatment and appears to increase slightly when held at a longer period of time. In the case of the cadmium and lithium compounds the crystallized samples gave higher resistances than their vitreous counterparts. In other cases the resistances decrease as crystallization occurs.

Figure 5:
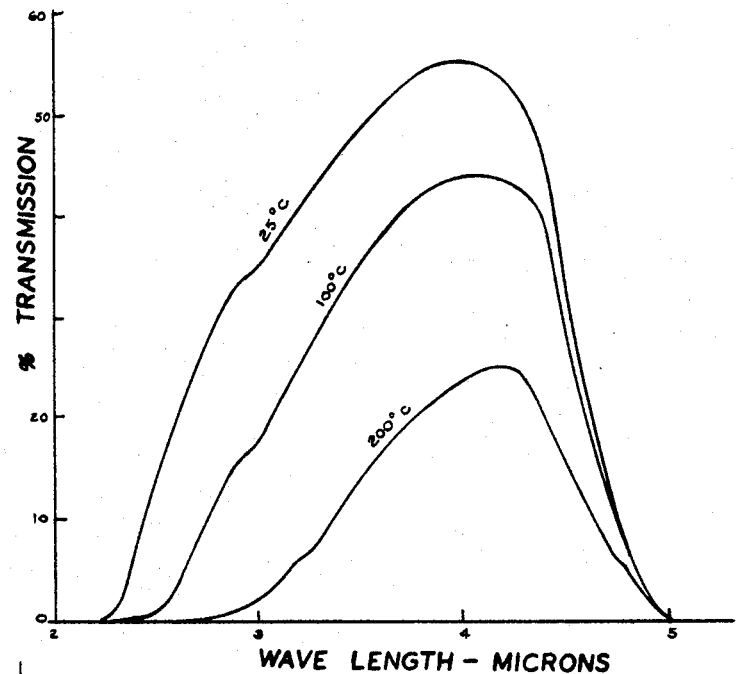

The infra-red radiation transmission of the phosphate materials is generally similar to typical phosphate glasses. It has been noted however, as the vanadium content of these glasses is increased visible radiation is absorbed and with a further increase in vanadium content this absorption extends into the near infrared region of the spectrum. The transmission characteristics of the glasses are shown by the graphical representations in FIG. 5.

What is claimed is:
1. A method for manufacturing a ceramic semi-conductor material comprising
heating a vanadium glass in the temperature range of about 250° C. to 380° C. for at least one-half hour to produce crystallization and change the resistivity of the ceramic material,
said vanadium glass consisting essentially of 60 to 84 weight percent $V_2O_5$ and 16 to 40 percent of a metal phosphate selected from the group consisting of barium metaphosphate, lead metaphosphate, lithium metaphosphate, sodium metaphosphate, cadmium metaphosphate, potassium metaphosphate and vanadium metaphosphate.
2. The method of claim 1 wherein the vanadium glass consists essentially of about 75 weight percent vanadium pentoxide and 25 percent potassium metaphosphate, and wherein the glass is crystallized at about 310° C.

References Cited

UNITED STATES PATENTS 3,278,317  10/1966  Blair et al. _____ 106—47

OTHER REFERENCES

Snell: "Electrical Properties and Uses of Glass," Glass Industry, September 1962, page 484 only.

DONALL H. SYLVESTER, *Primary Examiner.*

G. R. MYERS, R. L. LINDSAY, *Assistant Examiners.*

UNITED STATES PATENT OFFICE
CERTIFICATE OF CORRECTION

Patent No. 3,393,060

July 16, 1968

Gerald E. Blair et al.

It is certified that error appears in the above identified patent and that said Letters Patent are hereby corrected as shown below:

Column 4, line 45, "change" should read -- reduce --; line 47, "60" should read -- 70 --; line 48, "40" should read -- 30 weight --; lines 51 and 52, cancel "cadmium metaphosphate --.

Signed and sealed this 24th day of February 1970.

(SEAL)

Attest:

Edward M. Fletcher, Jr.

Attesting Officer

WILLIAM E. SCHUYLER, JR.

Commissioner of Patents